United States Patent Office 2,786,068
Patented Mar. 19, 1957

2,786,068

ALLYL 3,4-EPOXY-2-HYDROXYALKANOATES AND PROCESS FOR PREPARING THE SAME

Frederick C. Frostick, Jr., South Charleston, and Benjamin Phillips, Charleston, W. Va., assignors to Union Carbide and Carbon Corporation, a corporation of New York No Drawing. Application September 16, 1955, Serial No. 534,893

6 Claims. (Cl. 260—348)

This invention relates to the production of certain unsaturated esters of hydroxyepoxyalkanoic acids which are particularly adapted for use as monomers in various polymerization processes. More particularly, this invention is directed to a novel group of allyl 3,4-epoxy-2-hydroxyalkanoates and to processes for preparing the same.

The allyl 3,4-epoxy-2-hydroxyalkanoates of the present invention can be represented by the following general formula:

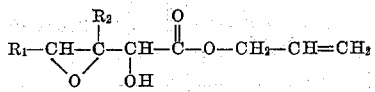

wherein $R_1$ and $R_2$ represent hydrogen and similar or dissimilar alkyl groups containing from 1 through 4 carbon atoms.

The compounds of this invention are characterized by the fact that they have one epoxy grouping

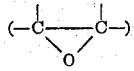

one hydroxyl grouping (—OH) both in the alkanoate portion of the molecule and one ethylenic grouping

in the allyl group. These functional groups make the compounds of this invention particularly useful for the preparation of a three-dimensional, cross-linked resin structure possessing highly advantageous and useful properties. For example, it has been found that these allyl esters can be polymerized alone or in combination with vinyl monomers such as vinyl chloride through the double bond contained in the allyl 3,4-epoxy-2-hydroxyalkanoate to form soluble, fusible linear polymers and later crosslinked through the epoxide group to solid, insoluble, infusible three-dimensional resin structures. The hydroxyl group, however, does not participate substantially in the polymer forming reaction. It does, however, have a definite function in that it enhances compatibility with certain types of other polymers and should enhance the dyeability of fiber-forming resins prepared from the monomer.

The present compounds can be conveniently prepared by reacting peracetic acid and an allyl 2-hydroxyalkenoate in accordance with the following equation:

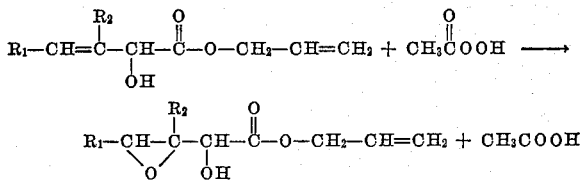

wherein $R_1$ and $R_2$ have the same meaning as hereinbefore defined.

The starting materials can be conveniently prepared by reacting an unsaturated aldehyde such as acrolein methacrolein, 2-ethyl-3-propyl acrolein, 2-methylcrotonaldehyde, 2-methyl-2-pentenal, 2-propyl-2-octenal, 2-ethylcrotonaldehyde and crotonaldehyde with hydrogen cyanide in the presence of a suitable catalyst to convert the aldehyde into the corresponding cyanohydrin which is then reacted with allyl alcohol in the presence of hydrogen chloride and a limited amount of water to form an ester according to the following equations:

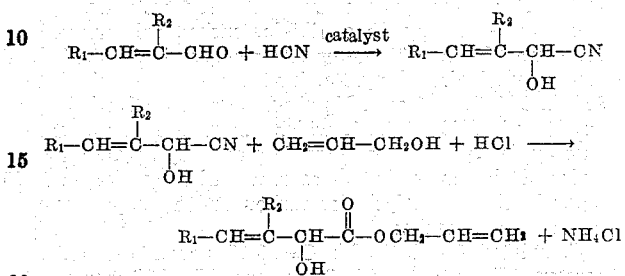

wherein $R_1$ and $R_2$ have the same meaning as hereinbefore defined.

Since only a limited amount of water is used, the ammonium chloride formed precipitates and can be readily separated by filtration. The filtrate is composed essentially of the crude ester which can be reacted directly with peracetic acid or refined by distillation and then reacted with peracetic acid.

In preparing the compounds of the present invention the allyl ester of a 2-hydroxyalkenoate is reacted with peracetic acid in a suitable reaction vessel at temperatures in the range of from 0° C. to 100° C. Temperatures are not narrowly critical but it is preferred to operate in a temperature range of from 20° C. to 50° C. The amount of each reactant is not narrowly critical but it is preferred, however, to employ a slight excess of peracetic acid. The reaction is allowed to proceed until approximately the theoretical amount of peracetic acid is consumed which is readily determined by titration for peracetic acid. The reaction time depends on the particular compound to be epoxidized and the temperature of the epoxidation reaction. In working up the crude product, the acetic acid, which is formed during the reaction, is removed continuously from the reaction mixture by distillation or by distillation under reduced pressure. Thereupon, the allyl epoxyhydroxyalkanoate can be isolated by distillation.

The following examples will serve to illustrate the novel processes involved in the production of the novel epoxides of this invention.

EXAMPLE 1

*Preparation of allyl 2-hydroxy-3,4-epoxybutyrate*

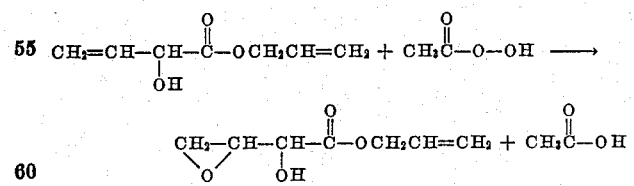

Allyl 2-hydroxy-3-butenoate (220 grams, 1.55 moles) was placed in a flask and heated to 40° C. with stirring. Thereafter, 547 grams of a 24.5 percent solution of peracetic acid in acetone (134 grams, 1.76 miles, of peracetic acid) were added over a period of 2¾ hours to the contents of the flask while the temperature was maintained at 40° C.–45° C. After the addition of the peracetic acid solution was complete, the reaction was continued at 40° C.–45° C. for 14.5 hours, at which time an analysis for peracetic acid indicated that substantially all of the peracetic acid had been consumed.

The reaction solution was then added dropwise to a still kettle containing approximately 1000 grams of ethylbenzene refluxing at 15 mm. of Hg pressure. During the addition, acetic acid, peracetic acid, acetone, and ethylbenzene were distilled overhead. After the reaction solution had all been added, the contents of the kettle were stripped of low-boiling materials, and there was obtained 234 grams of residue product which analyzed 69.8 percent (67 percent yield) as allyl 3,4-epoxy-2-hydroxybutyrate. This residue was then flash distilled by dropping on a hot surface maintained at 150° C.–160° C. at 0.5 mm. Hg pressure to yield 190 grams of distillate and 27 grams of residue. The distillate was then fractioned through a 17.5-in. packed column, and there was obtained 70 grams (27 percent yield) of allyl 3,4-epoxy-2-hydroxybutyrate, having a boiling point of 82° C.–90° C. at 1 mm. Hg absolute, a refractive index, ($n_D^{30}$), of 1.4590–1.4601, which analyzed 94.4 percent pure by determination of epoxide groups by the pyridine hydrochloride method, 100 percent purity by analytical saponification. Analysis for carbon and hydrogen gave the following results:

Calculated for $C_7H_{10}O_4$: C=53.18 percent, H=6.33 percent. Found: C=52.49 percent, H=6.39 percent.

EXAMPLE 2

*Preparation of allyl 2-hydroxy-3,4-epoxypentanoate*

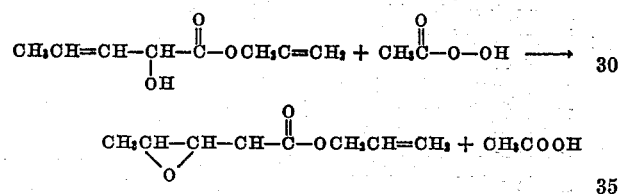

Allyl 2-hydroxy-3-pentenoate (632 grams, 4.05 moles) was placed in a flask and heated to 45° C. Then, 1641 grams of a 23.4 percent solution of peracetic acid in acetone (384 grams, 5.05 moles of peracetic acid) was added dropwise over a period of one hour and fifty minutes to the stirred contents of the flask while the temperature was maintained at 45° C.–50° C. The reaction was allowed to proceed at 45° C.–50° C. for 5 more hours, and then the solution was stored at −11° C. for 16 hours. At the end of this period, analysis for peroxide indicated that all of the theoretical amount of peracetic acid had been consumed.

The reaction solution was then added dropwise to a still kettle containing 1600 grams of ethylbenzene under reflux at 30 mm. Hg pressure. During the addition, acetic acid, acetone, peracetic acid, and ethylbenzene were distilled at the head. After addition, the contents of the kettle were distilled, and there was obtained 408 grams (59 percent yield) of allyl 3,4-epoxy-2-hydroxypentanoate, having a boiling point of 110° C. at 5 mm. Hg pressure, a refractive index, ($n_D^{30}$), of 1.4526, and analyzed 100 percent purity by analytical saponification, 100 percent purity by analytical bromination determination, and 88 percent purity by analysis for epoxide groups by the pyridine hydrochloride method. Analysis for carbon and hydrogen gave the following results:

Calculated for $C_8H_{12}O_4$: C=55.8 percent, H=7.03 percent. Found: C=55.3 percent, H=7.03, 7.07 percent.

In an analogous manner, allyl 2-hydroxy-3-methyl-3-pentenoate, allyl 2-hydroxy-3-ethyl-3-pentenoate, allyl 2-hydroxy-3-methyl-3-hexenoate, allyl 2-hydroxy-3-ethyl-3-heptenoate and allyl 2-hydroxy-3-propyl-3-nonenoate can be reacted with peracetic acid to produce allyl 2-hydroxy-3-methyl-3,4-epoxypentanoate, allyl 2-hydroxy-3-ethyl-3,4-epoxypentanoate, allyl 2-hydroxy-3-methyl-3,4-epoxyhexanoate, allyl 2-hydroxy-3-ethyl-3,4-epoxyheptanoate and allyl 2-hydroxy-3-propyl-3,4-epoxynonanoate respectively since there is no substantial difference in the manipulative procedure involved.

What is claimed is:

1. As a new composition of matter, an allyl 3,4-epoxy-2-hydroxyalkanoate corresponding to the general formula:

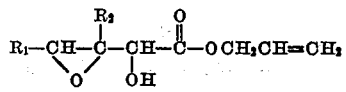

wherein $R_1$ and $R_2$ represent members selected from the group consisting of hydrogen and lower alkyl groups.

2. As a new composition of matter, allyl 3,4-epoxy-2-hydroxybutanoate.

3. As a new composition of matter, allyl 3,4-epoxy-2-hydroxypentanoate.

4. As a new composition of matter, allyl 3,4-epoxy-2-hydroxy-3-methylbutanoate.

5. As a new composition of matter, allyl 3,4-epoxy-2-hydroxy-3-ethylheptanoate.

6. The method of producing an allyl 3,4-epoxy-2-hydroxyalkanoate which comprises reacting an allyl 2-hydroxy-3-alkenoate and peracetic acid at a temperature in the range of from 0° C. to 100° C.

References Cited in the file of this patent

UNITED STATES PATENTS 2,680,109    Stevens                June 1, 1954

OTHER REFERENCES

Boeseken, Rec. Trav. Chim. 55:804–14 (1936). (C. A. 31:1785[9]).